United States Patent [19]

Kuhne et al.

[11] Patent Number: 5,064,042
[45] Date of Patent: Nov. 12, 1991

[54] TORSIONALLY ELASTIC CLUTCH

[75] Inventors: Viktor Kuhne, Bopfingen; Hark Twisselmann, Heidenheim; Franz Brenner, Nattheim, all of Fed. Rep. of Germany

[73] Assignee: J. M. Voith GmbH, Heidenheim, Fed. Rep. of Germany

[21] Appl. No.: 516,085

[22] Filed: Apr. 27, 1990

[30] Foreign Application Priority Data

May 22, 1989 [DE] Fed. Rep. of Germany ....... 3916575

[51] Int. Cl.$^5$ .......................... F16D 3/12; F16D 3/66; F16D 13/64
[52] U.S. Cl. .................................... 192/106.2; 464/66
[58] Field of Search .................. 192/106.2; 464/66, 67; 267/169, 170

[56] References Cited

U.S. PATENT DOCUMENTS

| 1,441,390 | 1/1923 | Woods | 464/67 |
| 2,248,228 | 7/1941 | Goodwin | 192/106.2 |
| 2,249,831 | 7/1941 | How | 464/66 |
| 2,284,349 | 5/1942 | Thelander | 192/106.2 X |
| 2,321,941 | 6/1943 | Rose | 192/106.2 X |
| 2,575,765 | 11/1951 | Nabstedt et al. | 464/66 X |
| 4,722,715 | 2/1988 | Billet et al. | 192/106.2 X |
| 4,747,800 | 5/1988 | Takeuchi | 192/106.2 X |
| 4,838,395 | 6/1989 | Chasseguet et al. | 192/106.2 X |
| 4,884,996 | 12/1989 | Schmitt et al. | 192/106.2 X |

FOREIGN PATENT DOCUMENTS

| 429536 | 5/1926 | Fed. Rep. of Germany | 464/66 |
| 3635043 | 7/1988 | Fed. Rep. of Germany . | |
| 347479 | 9/1972 | U.S.S.R. | 192/106.2 |
| 316358 | 8/1929 | United Kingdom | 464/66 |

Primary Examiner—Rodney H. Bonck
Attorney, Agent, or Firm—Jeffers, Hoffman & Niewyk

[57] ABSTRACT

The invention concerns a torsionally elastic clutch whose clutch halves are nested in disk fashion and feature window-shaped cutouts which house tangentially arranged helical springs, with an outer guide body arranged in the outer peripheral area of the individual spring and preventing the spring from buckling, which body is shorter than the spring. The clutch is characterized in that an inner guide body is provided also within the individual spring, which body is shorter than the spring, and in that the two guide bodies are in relation to the spring fixed in such a way that one guide body will remain constantly coordinated with the one end area of the spring and the other guide body constantly with the other end area of the spring.

4 Claims, 1 Drawing Sheet

TORSIONALLY ELASTIC CLUTCH

BACKGROUND OF THE INVENTION

The invention concerns a torsionally elastic clutch wherein the clutch halves are nested in disk fashion and have cutouts which house tangentially arranged helical springs. A guide body is located on the outer peripheral area of the individual spring in order to prevent buckling of the spring. Typically, the guide body is shorter than the spring. A clutch of this type is known from German patent disclosure 36 35 043.5.

Torque is introduced from one clutch half, which for instance is mounted directly on the flywheel of the drive engine, at one end of each of the tangentially arranged springs and transmitted from their other ends to the other clutch half. The spring ends are usually installed in suitable components for centering within cutouts provided in the clutch halves. The elasticity and the vibration or damping performance of the clutch can be influenced by suitable dimensioning of the springs, which are compressed under the effect of the torque.

The guide body between the radially outer area of the respective helical spring and the radial outer defining surface of the cutout prevents the spring from bowing outward. The guide body occupies the space between these surfaces, at least in the center area of the length of the spring. Thus, the spring retains its straight-line shape and its characteristics at a high speed of rotation, without local overstressing or disturbance in the absorption of the torque.

In the contact area with the spring, the guide body may feature a concave rounding that matches the diameter of the spring, in order to assure good guiding of the spring, and may include surfaces for guiding on the radially outer defining edge of the cutout for the spring or on the inner defining walls of the clutch. Being shorter than the spring length, the guide body is mostly located in the center area of the spring. In the operation of the clutch it shifts then toward one spring end, where it binds very quickly. Naturally, its effectiveness is greatly reduced thereby.

Proposed as a means to prevent buckling is a bolt that is looped by the windings of the spring. When making the bolt shorter than the spring, the same problem as described above will occur. But when making the bolt longer and permitting it to protrude beyond the spring ends and into the guide sleeves, such will be at the expense of design length, which is not always available. Thought might also be given to using an outer or inner guide body and giving it a telescopic design, so that it will perform its function also with the spring compressed. However, such a solution would result in a very expensive construction. The problem underlying the invention is to so design a torsionally elastic clutch of the general type discussed above that the individual springs will not bow out outwardly but will always maintain their alignment and that the manufacturing costs as well as the susceptibility to malfunction will be kept low.

SUMMARY OF THE INVENTION

The problems discussed above are solved by the clutch according to the present invention wherein the clutch halves are nested in disk fashion and include cutouts which house tangentially arranged helical springs. A guide body is located on the outer peripheral area of the individual spring to prevent buckling of the spring. According to the invention, within the individual spring there is provided an inner guide body that is shorter than the spring. The inner and outer guide bodies are fixed in relation with the spring such that one guide body remains continuously engaged with one end area of the spring and the other guide body remains continuously engaged with the other end area of the spring.

BRIEF DESCRIPTION OF THE DRAWINGS

The invention will be more fully explained with the aid of the drawing wherein.

DETAILED DESCRIPTION

Figure 1:
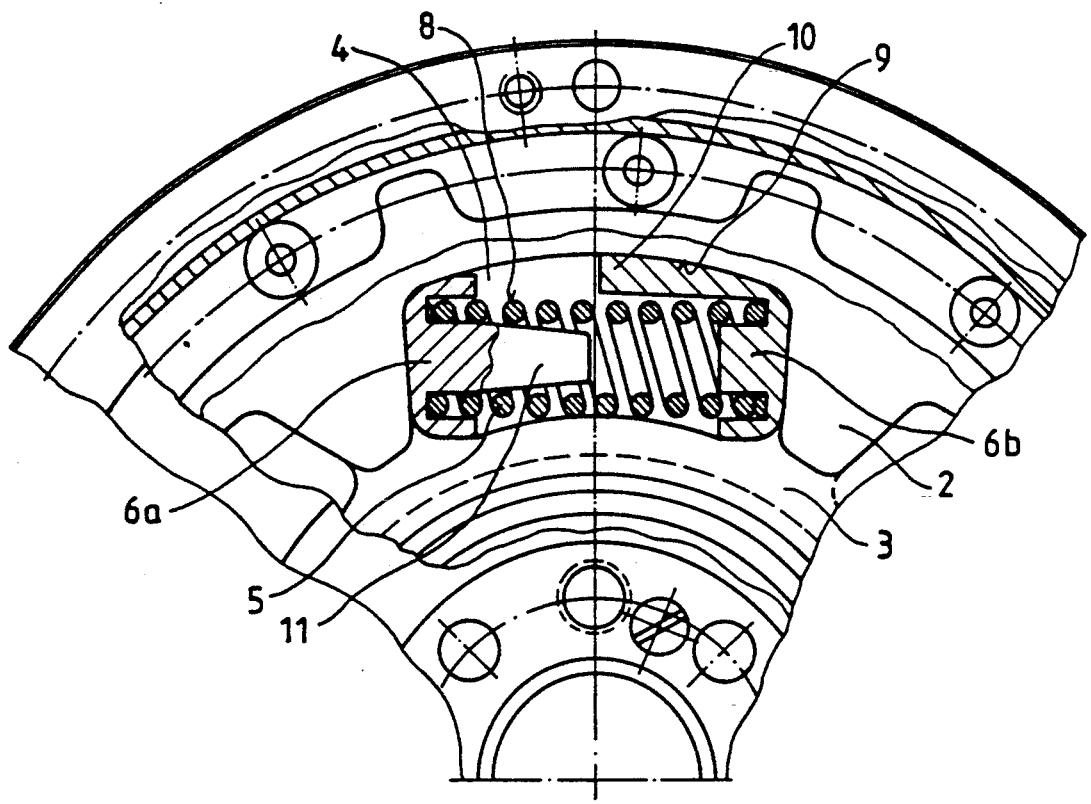
FIG. 1 is a plan view of a clutch according to a preferred embodiment of the invention shown partly in section.

The clutch illustrated in FIG. 1 consists of nested clutch halves 2 and 3. One clutch half 2 is connected with a drive engine (not shown) and consists itself of two side disks forming the sideways definition of the clutch. The other clutch half 3 is connected, e.g., with a vehicle drive (not shown). The two clutch halves 2 and 3 feature several window-shaped cutouts 4 in which, as is known, tangentially arranged helical compression springs 5 with centering pieces 6a, 6b on their ends 7 are inserted. The two clutch halves 2 and 3 engage these centering pieces 6 tangentially on both ends, so that in both directions of rotation of the clutch compression of the helical compression springs 5 will occur under the effect of the torque.

Inserted in the gap between the outside surfaces of the windings 8 of the spring 5 and the radially outer defining surface 9 of the cutout 4 is an outer guide body 10 which prevents the spring 5 at a high speed of rotation and possibly low load, with little compressive force on the spring 5, from bowing outward under the effect of centrifugal force, possibly slipping out of the centering piece 6b and being subjected to excessive local stress. The outer guide body 10 is integrally connected with centering piece 6b as shown in the right-hand part of FIG. 1.

The left side of the illustration depicts an inner guide body 11 of bolt-shaped design and a centering piece 6a, which is fixedly connected with the inner guide body 11. The conditions are illustrated somewhat more distinctly yet in FIG. 2, which shows on the right the outer guide body 10 and the centering piece 6b, integral with it, and illustrates on the left the inner guide body 11 and the centering piece 6a fixedly connected with it. Shown between these two parts is the spring 5 with its outer and inner profiles defined by the windings 8.

Figure 2:
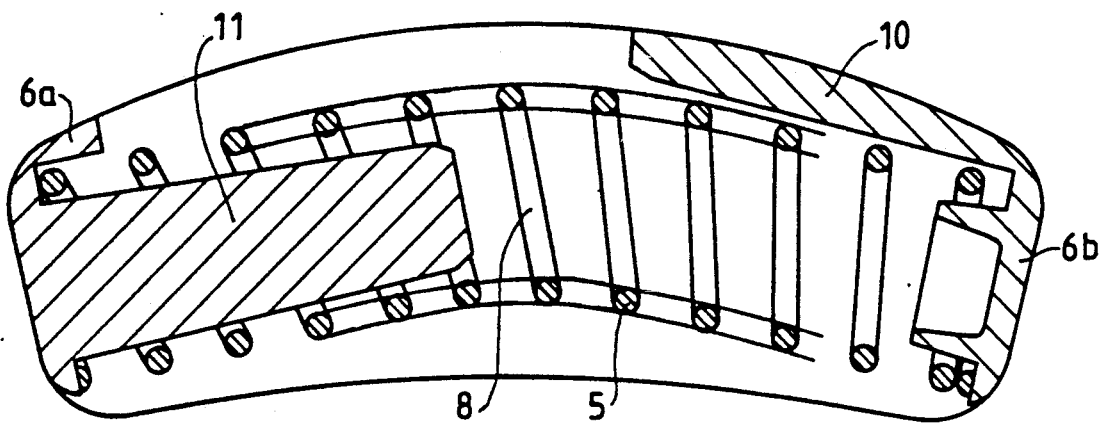
FIG. 2, is an enlarged sectional view of the two guide bodies and of the helical spring enclosed between them.

As shown in FIGS. 1 and 2, the distal ends of the inner guide body 11 and outer guide body 10 are in sufficiently close proximity to prevent buckling of the center portion of spring 8. Upon sufficient compression of spring 8, inner and outer guide bodies 11 and 10 will overlap.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A torsionally elastic clutch comprising:

a pair of clutch halves nested in disk fashion whereby one clutch half is received within the other clutch half, said halves including window-type cutouts, circumferentially arranged elongate helical springs housed within said cutouts and having opposite end portions, said springs having respective axes that are oriented in a tangential direction, each said spring having a length that is sufficiently larger than its diameter that said spring would normally be subject to buckling when compressed or subjected to high centrifugal forces, a pair of guide means connected to respective clutch halves and positioned respectively at the end portions of each of said springs, the guide means positioned at one end portion of said spring comprising an inner guide body disposed within said one end portion of said spring and being in close proximity therewith, and further comprising an outer spring centering piece disposed outside of said spring one end portion, said outer centering piece being fixedly connected to said inner guide body, the guide means positioned at the other end portion of said spring comprising an outer guide body disposed outside of said other spring end portion and being in close proximity therewith, and further comprising an inner spring centering piece disposed within said spring other end portion, said inner spring centering piece being fixedly connected to said outer guide body, said inner and outer guide bodies extending along said spring a substantially greater extent than respective said outer and inner centering pieces and terminating in ends that are in sufficiently close proximity to each other that a center portion of said spring is restrained from buckling.

2. The clutch of claim 1 wherein each said guide body is less than one-half as long as the spring length.

3. The clutch of claim 1 wherein said inner and outer guide bodies are capable of overlapping upon sufficient spring compression.

4. A torsionally elastic clutch comprising:

a pair of clutch halves nested in disk fashion whereby one clutch half is received within the other clutch half, said halves including window-type cutouts, circumferentially arranged elongate helical springs housed within said cutouts and having opposite end portions, said springs having respective axes that are oriented in a tangential direction, each said spring having a length that is sufficiently larger than its diameter that said spring would normally be subject to buckling when compressed or subjected to high centrifugal forces, a pair of guide means connected to respective clutch halves and positioned respectively at the end portions of each of said springs, the guide means positioned at one end portion of said spring comprising an inner guide body disposed within said one end portion of said spring and being in close proximity therewith, and further comprising an outer spring centering piece disposed outside of said spring one end portion, said outer centering piece being fixedly connected to said inner guide body, the guide means positioned at the other end portion of said spring comprising an outer guide body disposed outside of said other spring end portion and being in close proximity therewith, and further comprising an inner spring centering piece disposed within said spring other end portion, said inner spring centering piece being fixedly connected to said outer guide body, each said guide body being about half as long as the spring length, said inner and outer guide bodies restraining said spring from buckling.

* * * * *